Figures 1, 8:
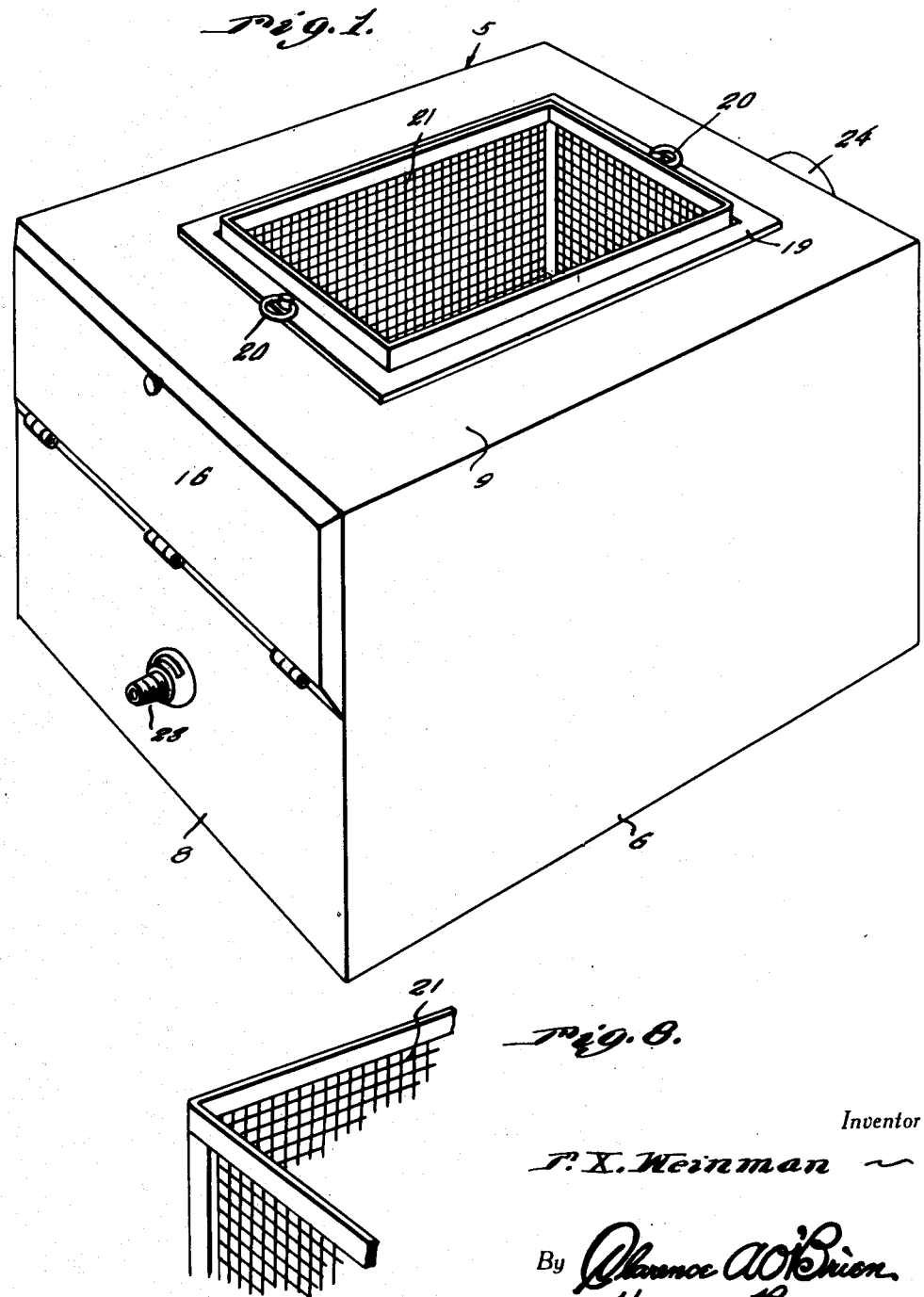

May 23, 1939.　　　F. X. WEINMAN　　　2,159,578
COMBINATION DEEP FAT FRYING KETTLE
Filed Feb. 11, 1938　　　5 Sheets-Sheet 1

Inventor
F. X. Weinman
By Clarence A. O'Brien
Hyman Berman
Attorneys

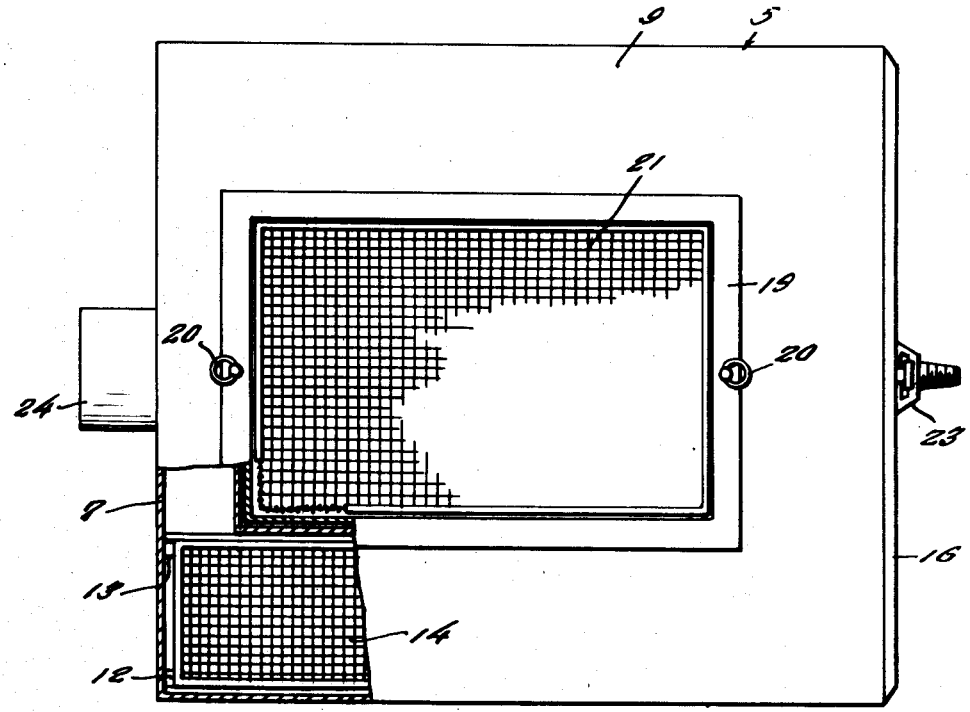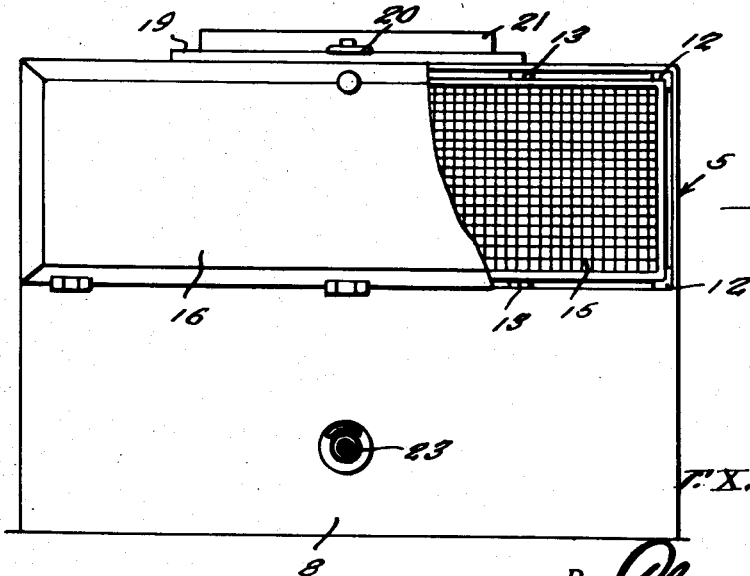

May 23, 1939.  F. X. WEINMAN  2,159,578
COMBINATION DEEP FAT FRYING KETTLE
Filed Feb. 11, 1938  5 Sheets-Sheet 3
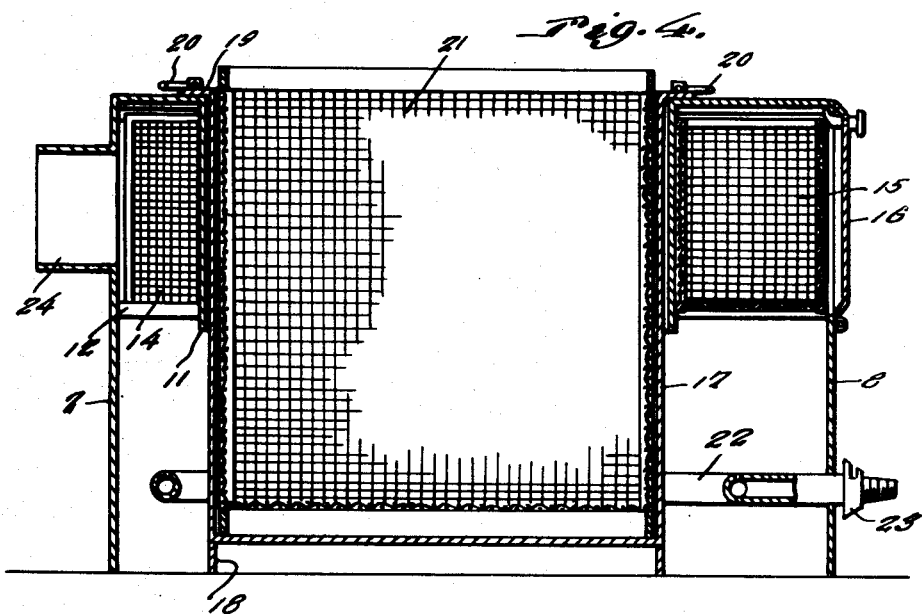
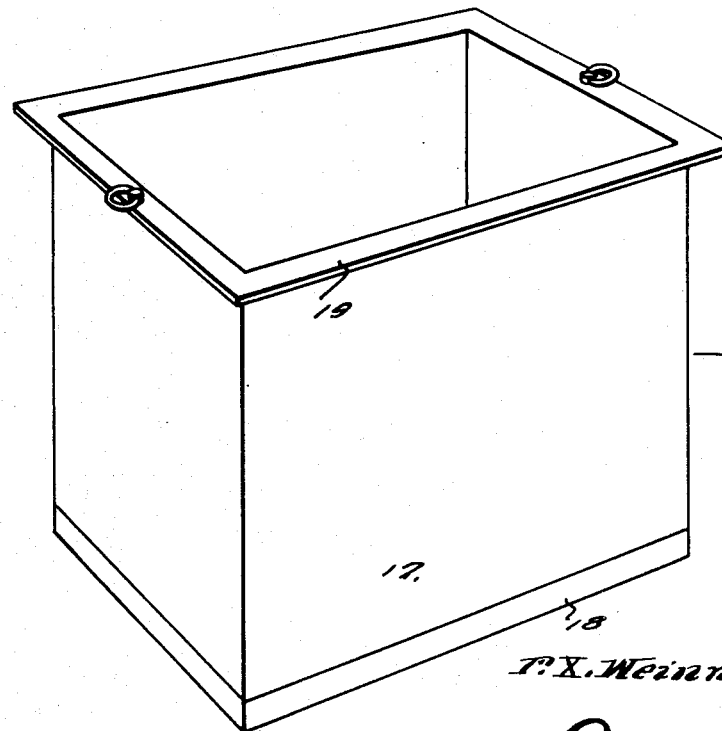
Inventor
F. X. Weinman
By Clarence A. O'Brien
Hyman Berman
Attorneys May 23, 1939.  F. X. WEINMAN  2,159,578
COMBINATION DEEP FAT FRYING KETTLE
Filed Feb. 11, 1938  5 Sheets-Sheet 4
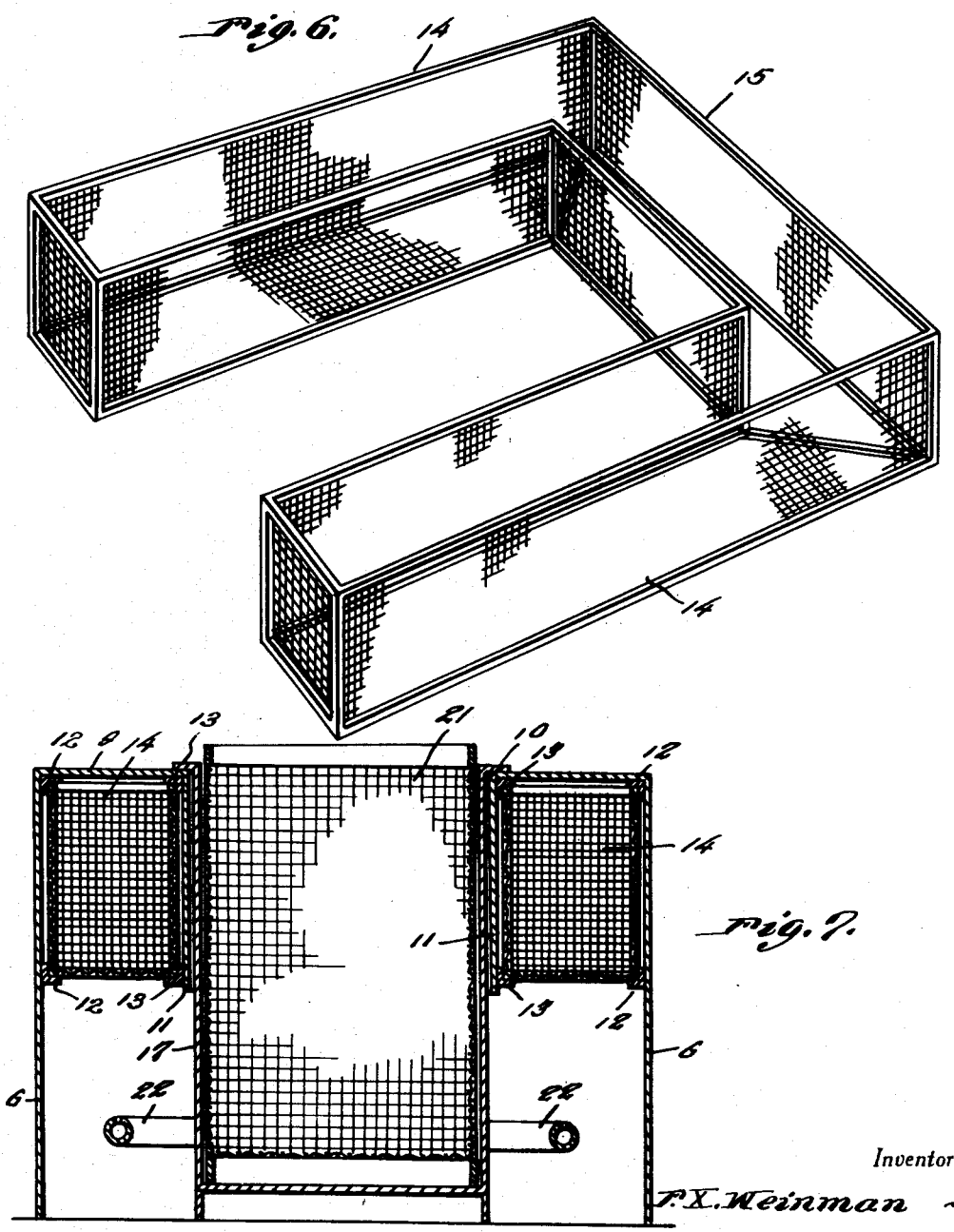

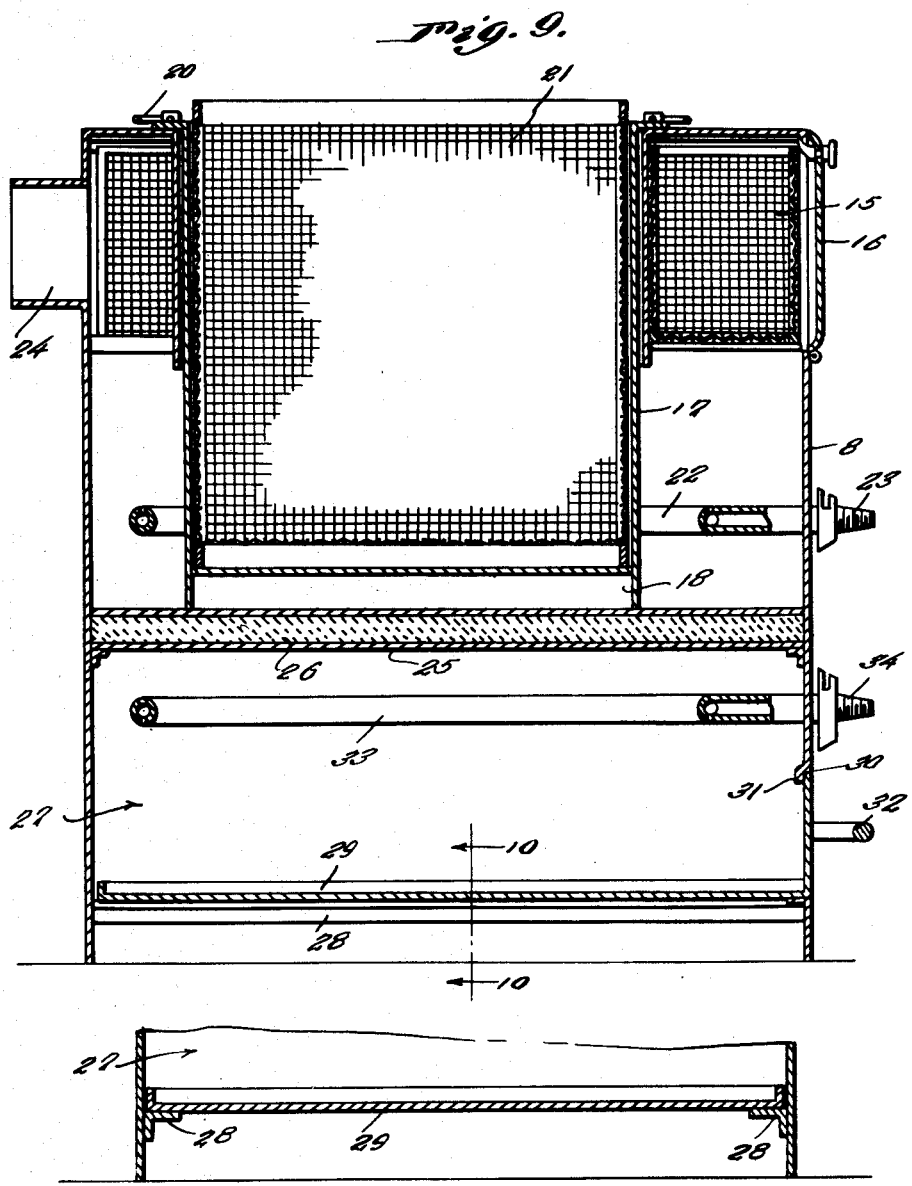

Patented May 23, 1939

2,159,578

UNITED STATES PATENT OFFICE 2,159,578

COMBINATION DEEP FAT FRYING KETTLE

Frank X. Weinman, Olean, N. Y., assignor of one-half to Bruno A. Haberbush, Olean, N. Y.

Application February 11, 1938, Serial No. 190,061

4 Claims. (Cl. 53—7)

This invention relates to cooking devices and an object of the invention is to provide a combination article for use in frying such as fish, oysters, crullers, and the like which are generally fried in a receptacle of grease; as well as for use in toasting bread or the like.

The many uses to which the invention may be put will readily suggest themselves to the user; and the invention together with its objects and advantages will be best understood from a study of the following description taken in connection with the accompanying drawings wherein:

Figure 1 is a perspective view of the device,

Figure 2 is a top plan view thereof with parts broken away and shown in section, Figure 3 is a front elevational view of the device with certain parts broken away, Figure 4 is a vertical sectional view through the device, Figure 5 is a perspective view of the frying pan, Figure 6 is a perspective view of a toasting basket, Figure 7 is a vertical sectional view taken at right angles to Figure 4, Figure 8 is a perspective view of an upper corner of the frying basket.

Figure 9 is a view similar to Figure 4 but illustrating a slightly modified form of the invention, and Figure 10 is a detail sectional view taken substantially on the line 10—10 of Figure 9.

Referring to the drawings by reference numerals it will be seen that in accordance with the present invention, the same, in each embodiment thereof comprises a substantially rectangular casing 5 having side walls 6, rear wall 7, front wall 8, and top wall 9.

The top wall 9 is provided with an enlarged opening 10 and at the opening 10 the top wall is provided with a depending flange 11.

Supported on the inner side of the walls 6 are upper and lower rails 12 while supported on the sides of the flanges 11 confronting the walls 6 are upper and lower rails 13 complemental to the rails 12 and the rails 12 and 13 serve to accommodate the parallel sides 14 of a substantially U-shaped relatively shallow toasting basket 15. The basket 15 is suitably formed of reticulated or wire material as shown in Figure 6 and is insertible into the casing 5 through an opening provided therefor in the front wall 8 of the casing. For this opening in the wall 8 of the casing there is provided a suitable vertically swinging hinged door 16.

Adapted to fit within the casing 5 and within the confines of the flange 11 is a relatively deep imperforate frying pan or receptacle 17. At the bottom thereof the pan 17 is provided with a continuous supporting flange 18 adapted to rest on the supporting surface upon which the cooking device is placed, such as a table, or the like. At the open top thereof the pan 17 is provided with a continuous outstanding flange 19 which rests on the top wall 9 of the casing 5 at the opening 10. At opposite ends thereof the pan 17 is provided with suitable handles 20 to facilitate the placing of the pan into the casing 5 and the removal of the pan from said casing.

The frying pan 17 which is adapted to contain grease to the desired depth also accommodates therein a relatively deep frying basket 21. The basket 21 consists of a suitable frame structure with the bottom side and end walls thereof formed of reticulated material such as screen wire or the like. The frying basket 21 is of such a depth as to extend slightly above the top wall 9 of the casing 5 when the basket 21 is arranged within the pan 17.

Pan 17 and basket 21 will be used when frying fish, doughnuts, and the like.

The toasting basket 15 will be used for toasting bread or the like as found desirable.

Suitably mounted within the casing 5 is a substantially loop-shaped burner 22, and the inlet pipe for the burner 22 is indicated by the reference numeral 23 and extends through the front wall 8 to be connetced to a gas supply line.

Extending from the rear wall 7 of the case is a flue 24 through which smoke and the products of combustion may escape.

The form of the invention shown in Figures 9 and 10 differs from that form shown in Figures 1 to 8 inclusive in the following respects:

In the second form of the invention, that is the form shown in Figures 9 and 10, the casing is of materially greater depth than the casing embodied in the first form of the invention and is provided with a horizontal partition 25, insulated as at 26, and as shown, whereby to provide in the lower portion of the casing a broiler compartment 27.

Provided in the bottom of the compartment 27 are rails 28 which slidably accommodate a broiler indicated generally by the reference numeral 29. The broiler 29 is provided to slide inwardly and outwardly with respect to the compartment 27 through an opening 30 provided therefor in the front wall of the casing. At the upper edge of the opening the wall is provided with a depending stop lug 31 against which the upper edge of the front wall of the broiler abuts to limit inward movement of the broiler. At the front thereof the broiler is also provided with a suitable handle 32 to facilitate the handling of the broiler.

Also arranged within the compartment 27 and spaced slightly downwardly from the partition 25 is a substantially loop-shaped burner 33, and the inlet pipe for the burner 33 is indicated by the reference numeral 34 and extends through the front wall 8 of the casing to be connected to a gas supply line.

In connection with the above it will be noted that the perforations of the burner 33 are in the underside thereof so that the flame will be directed downwardly as will be found most desirable.

Thus the device provided as shown in Figures 9 and 10 may be in addition to the uses already hereinabove enumerated, be used for broiling steaks, chops, etc.

It is thought that the manner in which the frying kettle or utensil may be used will be clear to those skilled in the art, and that the utility and advantages of the invention will be clearly understood without a further description thereof.

Having thus described the invention what is claimed as new is:

1. A cooking device comprising a casing having opposed side walls, a front wall, a rear wall and a top wall, a loop burner arranged within said casing, and said top wall of the casing having an opening therein, and a cooking vessel insertable into the casing through said opening and adapted to fit within the casing within the confines of said burner, and said front wall of the casing being provided with an opening, a hinged door for said opening, rails mounted on the side walls of the casing internally thereof, and a substantially U-shaped toasting basket insertable into the casing through the opening in said front wall with the sides of said toasting basket engaging said rails to be slidably supported thereby.

2. A cooking device comprising a casing, a substantially U-shaped toasting basket mounted horizontally in said casing, and a cooking vessel mounted in the casing between the legs of said basket.

3. A cooking device comprising a casing including a top and a vertical wall having openings therein, a removable vessel insertable vertically in the casing through the opening in the top thereof, and a substantially U-shaped removable toasting basket insertable horizontally in the casing through the opening in the vertical wall thereof and adapted to straddle said cooking vessel.

4. A cooking device comprising a casing including opposed side walls, a front wall having an opening therein and a top having an opening therein, a flange depending from the top into the casing, pairs of rails mounted on the flange and the side walls in the casing, a removable cooking vessel insertable vertically in the casing through the opening in the top thereof within the confines of the flange, and a substantially U-shaped, foraminous toasting basket insertable horizontally in the casing through the opening in the front thereof and slidably engageable on the rails.

FRANK X. WEINMAN.